United States Patent
Adhiraju et al.

(10) Patent No.: US 8,412,681 B2
(45) Date of Patent: Apr. 2, 2013

(54) CONTENT ARCHIVAL AND RETRIEVAL

(75) Inventors: Shrikrishna Adhiraju, Andhra Pradesh (IN); Sudhakar Kanakaraj, Tamilnadu (IN); Sachin Yambal, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/193,906

(22) Filed: Jul. 29, 2011

(65) Prior Publication Data

US 2012/0030181 A1 Feb. 2, 2012

(51) Int. Cl.
*G06F 17/30* (2006.01)
(52) U.S. Cl. .................... 707/661; 707/E17.005
(58) Field of Classification Search .............. 707/661, 707/E17.005
See application file for complete search history.

(56) References Cited

U.S. PATENT DOCUMENTS

| | | | |
|---|---|---|---|
| 2008/0059543 A1* | 3/2008 | Engel | 707/204 |
| 2008/0263297 A1* | 10/2008 | Herbst et al. | 711/161 |
| 2009/0150866 A1* | 6/2009 | Schmidt | 717/120 |
| 2009/0271455 A1* | 10/2009 | Nagarajan et al. | 707/204 |
| 2011/0258136 A1* | 10/2011 | Adhiraju et al. | 705/342 |

* cited by examiner

*Primary Examiner* — Shyue Jiunn Hwa
(74) *Attorney, Agent, or Firm* — Fish & Richardson P.C.

(57) ABSTRACT

Content archival and retrieval, in which connections with multiple, different enterprise applications operated by an organization are established. In addition, a connection with a central archival system is established and content to archive is received from the multiple, different enterprise applications. The central archival system is controlled to archive, in a central location, the content received from the multiple, different enterprise applications such that content from a first type of enterprise application is archived in the central location together with content from a second type of enterprise application.

20 Claims, 21 Drawing Sheets

Policy Rules 1700

- Record Type (one or multiple values)
- Pre-Ingestion Handler (one or multiple handlers)
- Post-Ingestion Handler (one or multiple handlers)
- PDF/A conversion
- Apply Archive System Lifecycle
- Initiate Archive System Workflow
- Target Folder
- Retention Phases
- Pre-Retrieval Handler (one or multiple handlers)
- Post-Retrieval Handler (one or multiple handlers)
- Allow Special Deletion

FIG. 17

Events to Log and Audit 2100

- Record Type Creation, Modification and Deletion
- Policy Creation, Modification and Deletion
- Structural/Relational Data Extraction
- Content Extraction
- Assembly and Retrieval of Records
- Policy Enforcement and Policy Removal
- Policy Phase Change
- Records Lifecycle Change
- Workflow Triggering
- PDF/A Generation
- Records Deletion
- Virtual Document Creation for a Record

FIG. 21

CONTENT ARCHIVAL AND RETRIEVAL

FIELD

The present application claims the benefit of Indian Patent Application No. 2173/CHE/2010, filed on Jul. 30, 2010, which is incorporated herein by reference in its entirety for all purposes.

BACKGROUND

A company may use an archival system to archive content and documents related to the company and its processes. The company may use multiple, different archival systems to separately archive content developed using different processes.

SUMMARY

In one aspect, a system archives content from multiple, different types of enterprise applications in a central location. The system includes multiple, different application connectors that are configured to interface with multiple, different enterprise applications operated by an organization. The multiple, different application connectors include at least a first application connector configured to interface with a first type of enterprise application operated by the organization, and a second application connector configured to interface with a second type of enterprise application operated by the organization. The second type of enterprise application is different than the first type of enterprise application. The system also includes an archival system connector that is configured to interface with a central archival system. The central archival system is configured to archive content from the multiple, different enterprise applications in a central location. The system further includes an application server that is configured to receive, using the multiple, different application connectors, content to archive from the multiple, different enterprise applications, and control, using the archival system connector, the central archival system to archive, in the central location, the content received from the multiple, different enterprise applications such that content from the first type of enterprise application is archived together in the central location with content from the second type of enterprise application.

Implementations may include one or more of the following features. For example, the application server may be configured to provide a standard user interface that enables a user to provide input to control archival operations for the multiple, different enterprise applications and the central archival system, receive user input that is entered into the standard user interface, and control, based on the received user input, archival operations for the multiple, different enterprise applications and the central archival system. In addition, the application server may be configured to convert, into a different format, at least a portion of the content received from the multiple, different enterprise applications prior to controlling the central archival system to archive, in the central location, the content received from the multiple, different enterprise applications.

In some implementations, the application server may be configured to receive user input defining a complex record type that includes information from the multiple, different enterprise applications, define the complex record type based on the received user input, and handle archival of information from the multiple, different enterprise applications using the complex record type. In these implementations, the complex record type may include first content from a first enterprise application, first metadata from the first enterprise application, second content from a second enterprise application, second metadata from the second enterprise application, and record data that describes aspects of a record of the complex record type. The second enterprise application may be different than the first enterprise application, the first content may be different than the second content, and the first metadata may be different than the second metadata. The application server may be configured to create a single record of the complex record type by integrating, into the single record of the complex record type, the first content from the first enterprise application, the first metadata from the first enterprise application, the second content from the second enterprise application, and the second metadata from the second enterprise application and adding, to the single record of the complex record type and in the record data portion of the complex record type, data describing aspects of creation of the single record.

Further, the application server may be configured to detect an archival operation that uses the complex record type and, in response to the archival operation that uses the complex record type, identify content needed from the multiple, different enterprise applications to populate the complex record type and identify metadata needed from the multiple, different enterprise applications to populate the complex record type. The application server may be configured to access the identified content and the identified metadata and control, using the archival system connector, the central archival system to store, in a single record of the complex record type, the accessed content and the accessed metadata.

In some examples, the application server may be configured to handle an event that results in a request to at least one of archive data in the central archival system and retrieve data from the central archival system and, in response to the event, log, in electronic storage separate from the central location of the central archival system, the event to identify data associated with the event and one or more of the multiple, different enterprise applications associated with the event. In these examples, the application server may be configured to, based on the logging, audit the central archival system to determine whether the data was properly archived. The application server may be configured to, in response to a determination that the data was not properly archived, take corrective action with respect to the central archival system to cause proper archival of the data in the central location. Also, the application server may be configured to calculate, based on the logging and auditing, archival statistics related to archival operations performed for each of the multiple, different enterprise applications and success or failure of the archival operations, generate a report that reflects the calculated archival statistics, and output, using an output device, the report.

In addition, the application server may be configured to handle an archival event that results in a request to archive data in the central archival system and, in response to the archival event, log, in electronic storage separate from the central location of the central archival system, the archival event to identify data archived as part of the archival event and one or more of the multiple, different enterprise applications providing the data archived as part of the archival event. The application server also may be configured to handle a retrieval event that results in a request to retrieve data from the central archival system and, in response to the retrieval event, log, in electronic storage separate from the central location of the central archival system, the retrieval event to identify data retrieved as part of the retrieval event and one or more of the multiple, different enterprise applications providing the data retrieved as part of the retrieval event.

In some implementations, the application server may be configured to receive input related to a new enterprise application to archive in the central archival system, add a new application connector to interface with the new enterprise application based on the input, update archival record types and archival policies to account for the new enterprise application based on the input, and handle archival for the new enterprise application based on the new application connector and the updated archival record types and archival policies. In these implementations, the application server may be configured to maintain an existing application connector used by a previous enterprise application whose content was previously being archived in the central archival system, existing archival record types used in archiving content from the previous enterprise application, and existing archival policies used in archiving content from the previous enterprise application such that addition of the new enterprise application does not impact archival of content from the previous enterprise application.

In some examples, the application server may be configured to receive user input defining one or more policies to apply in archiving content in a particular record type. The particular record type may be used to archive content from multiple, different enterprise applications. In these examples, the application server may be configured to, based on the received input, define, in electronic storage, the one or more policies to apply in archiving content in the particular record type. The one or more policies may be applicable to archiving content from all of the multiple, different enterprise applications whose content is archived in the particular record type.

Further, the application server may be configured to identify an archival operation that relates to the particular record type, apply the one or more policies defined for the particular record type to the archival operation based on the identification of the archival operation as relating to the particular record type, and perform the archival operation that relates to the particular record type based on application of the one or more policies. Also, the application server may be configured to receive user input defining a retention policy to apply in archiving content in the particular record type and, based on the received input, define, in electronic storage, the retention policy to apply in retaining content archived in the particular record type. Further, the application server may be configured to receive user input defining a location policy to apply in archiving content in the particular record type. The location policy may define a location within the central archival system at which to store content archived using the particular record type. The application server may be configured to, based on the received input, define, in electronic storage, the location policy to apply in determining the location within the central archival system at which to store content archived using the particular record type.

In another aspect, a computer-implemented method of archiving content from multiple, different types of enterprise applications in a central location includes establishing, using multiple, different application connectors, connections with multiple, different enterprise applications operated by an organization. The multiple, different application connectors include at least a first application connector configured to interface with a first type of enterprise application operated by the organization, and a second application connector configured to interface with a second type of enterprise application operated by the organization. The second type of enterprise application is different than the first type of enterprise application. The method also includes establishing, using an archival system connector, a connection with a central archival system. The central archival system is configured to archive content from the multiple, different enterprise applications in a central location. The method further includes receiving, over the connections established using the multiple, different application connectors, content to archive from the multiple, different enterprise applications and controlling, using the archival system connector, the central archival system to archive, in the central location, the content received from the multiple, different enterprise applications such that content from the first type of enterprise application is archived in the central location together with content from the second type of enterprise application.

In yet another aspect, at least one computer-readable storage medium encoded with executable instructions that, when executed by at least one processor, cause the at least one processor to perform operations. The operations include establishing, using multiple, different application connectors, connections with multiple, different enterprise applications operated by an organization. The multiple, different application connectors including at least a first application connector configured to interface with a first type of enterprise application operated by the organization, and a second application connector configured to interface with a second type of enterprise application operated by the organization. The second type of enterprise application is different than the first type of enterprise application. The operations also include establishing, using an archival system connector, a connection with a central archival system. The central archival system is configured to archive content from the multiple, different enterprise applications in a central location. The operations further include receiving, over the connections established using the multiple, different application connectors, content to archive from the multiple, different enterprise applications and controlling, using the archival system connector, the central archival system to archive, in the central location, the content received from the multiple, different enterprise applications such that content from the first type of enterprise application is archived in the central location together with content from the second type of enterprise application.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIG. 17 is a diagram which illustrates exemplary policy rules.

FIG. 21 is a diagram which illustrates exemplary audited events.

DETAILED DESCRIPTION

Figure 1:
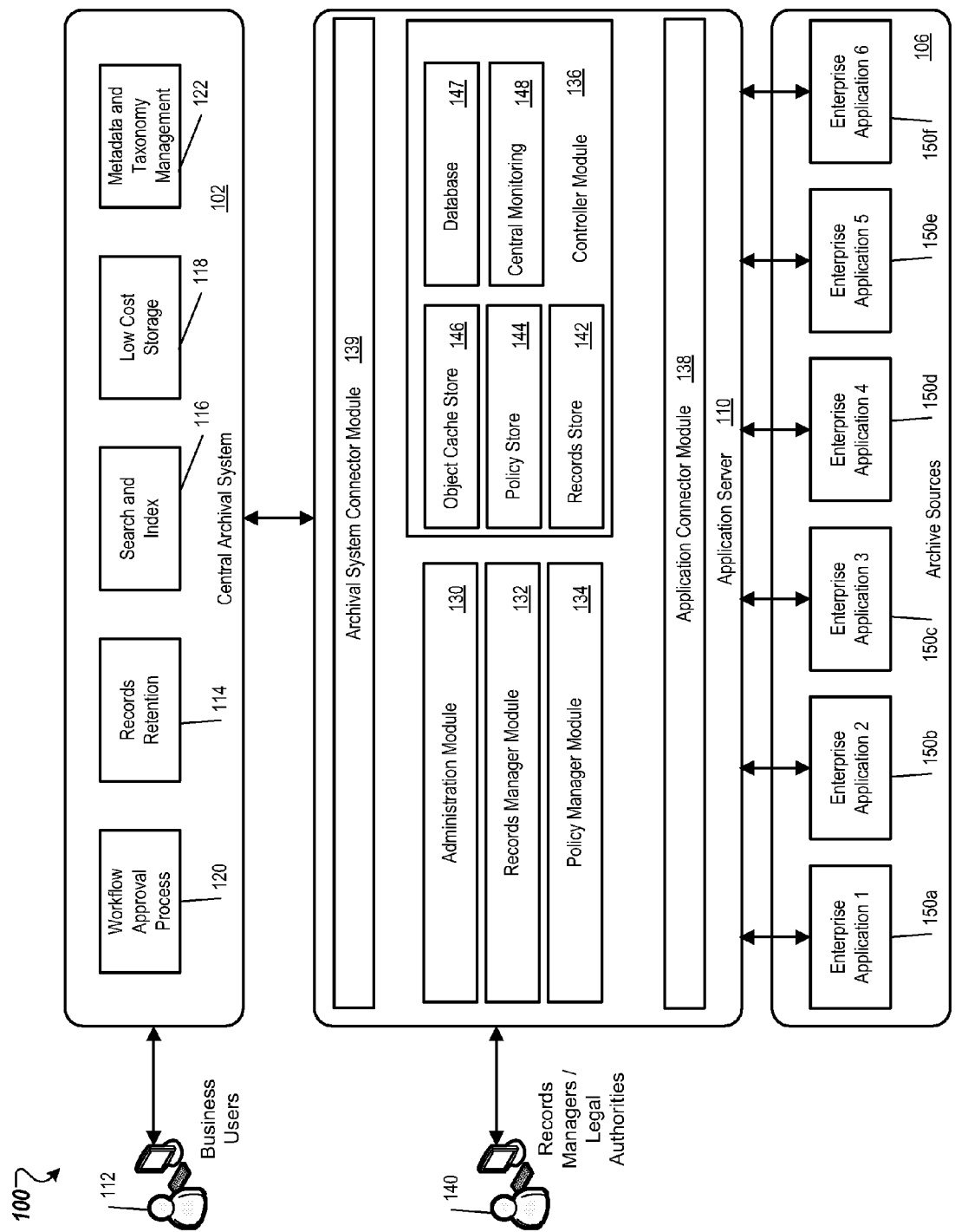
FIGS. 1-6, 8, 9, 11, 12, 19, and 22 are diagrams of exemplary systems.

FIG. 1 illustrates a system 100 for archiving content from multiple, different types of enterprise applications in a central location. The system 100 includes a central archival system 102, archive sources 106, and an application server 110. The system 100 may be used, for example, to define, implement, and manage archival, preservation, retrieval and disposition policies for content for an enterprise. One example use of the system 100 is for supporting litigation discovery proceedings. Another example use of the system 100 is for supporting compliance with government regulations and/or industry guidelines for records retention.

Business users 112 may use the central archive system 102 for records retention 114, searching and indexing documents 116, low cost storage 118 of documents and other data, workflow approval processes 120 and for metadata and taxonomy management 122. The application server 110 includes an administration module 130, a records manager module 132, a policy manager module 134, a controller module 136, an application connector module 138, and an archival system connector module 139.

The administration module 130 may be used by records managers and legal authorities 140, or other users, to administer and configure archival and retrieval processes. The administration module 130 may provide, for example, a set of user interface components which the records managers and legal authorities 140 may use to design records policies for archiving, retaining, retrieving, and disposing records, to generate reports, to monitor archival processes, to initiate workflows, to review and approve record types and record policies, and to perform auditing of archival and retrieval activity.

The records managers and legal authorities 140 may use the records manager module 132 to manage record types and records information. For example, the records manager module 132 may be used to define a record type. Record and record type information may be stored, for example, using XML (eXtensible Markup Language). The records manager module 132 may be used to transfer or communicate record and record type information to other modules of the application server 110.

The records managers and legal authorities 140 may use the policy manager module 134 to define and manage policies. The policy manager module 134 may be used to enforce policies on records. The policy manager module 134 may be used to transfer or communicate policy-related information to other modules of the application server 110.

The controller module 136 may coordinate or control other modules and may provide common functionality used by other modules, such as central monitoring, auditing, reporting, and database functionality. The controller module 136 may provide functionality to cache information in one or more memory caches (e.g., a records store 142, a policy store 144, an object cache store 146, etc.) and/or to store information in a database 147. For example, the policy manager module 134 may store policy-related information in the policy store 144 and the records manager module 132 may store record and record type information in the records store 144.

The controller module 136 may provide functionality to cache content and metadata in the object cache store 146. The controller module 136 may provide interfaces to store and retrieve other information to and from the database 147, such as audit trail entries and report-related information (e.g., report definitions, generated reports). The controller module 136 includes a central monitoring component 148 which may provide features such as logging, tracing, auditing, and reporting.

The application connector module 138 includes a set of application connectors. Each application connector may be configured to interface with a different type of enterprise application. For example, the application connector module 138 may include an application connector for each enterprise application 150a-150f included in the archive sources 106. Each of the enterprise applications 150a-150f may be a different type of enterprise application. Each of the enterprise applications 150a-150f may be, for example, of one of the following types of enterprise applications or systems: enterprise content management or other content management, business process management, human resource management, customer relationship management, sales force automation, enterprise resource planning, product lifecycle management, supply chain management, supplier relationship management, enterprise forms automation, automated billing systems, relational database management system, data warehousing, business intelligence, enterprise portal, or some other type of enterprise application. A new application connector may be added to the application connector module 138 to support a new enterprise application.

The archival system connector module 106 may be used to connect to the central archival system 102 and to inject content and metadata into the central archival system 102 and to extract content and metadata out of the central archival system 102. The archival system connector module 106 may also provide functionality for PDF (Portable Document Format) conversion, logging and tracing, auditing, workflow initiation, taxonomy structure creation and navigation, virtual document creation, structured data conversion, and other configuration tasks.

Figure 2:
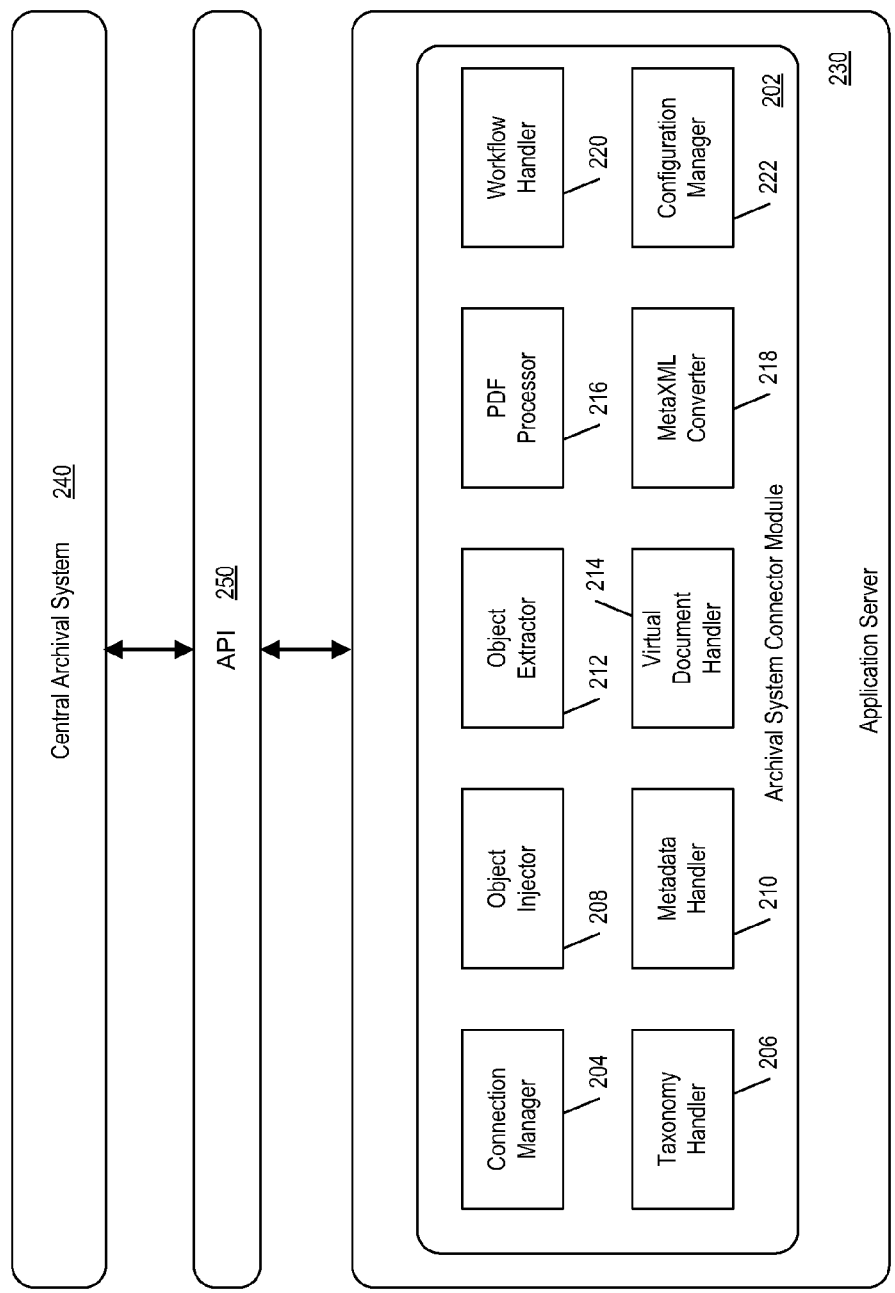

In further detail and as shown in FIG. 2, an archival system connector module 202 may include connection manager 204, taxonomy handler 206, object injector 208, metadata handler 210, object extractor 212, virtual document handler 214, PDF processor 216, meta-XML converter 218, workflow handler 220, and configuration manager 222 components. As discussed above, the archival system connector module 202 may be included in an application server 230, and may connect to a central archival system 240.

The connection manager component 204 may be used to manage a session (e.g., establish a session, release a session) with the central archival system 240. For example, a session may be established by invoking interfaces included in an API (Application Programming Interface) 250. The taxonomy handler component 206 may be used to associate an injected record with a folder path included as part of a taxonomy folder structure in the central archival system 240. The taxonomy handler component 206 may be called by the object injector component 208 as each record is injected, and may return one or more folder paths to the object injector component 208.

The object injector component 208 handles injections of objects into the central archival system 240, where an object may be, for example, a simple record or a complex record. A complex record is a record which includes content from multiple sources. The object injector component 208 may inject a record within an appropriate taxonomy folder structure as indicated by the taxonomy handler component 206. The object injector component 208 may update metadata of a record as indicated by the metadata handler component 210. The metadata handler component 210 indicates values for one or more metadata items for a record. The metadata handler component 210 may be invoked by the object injector component 208 as each record is injected.

Figure 3:
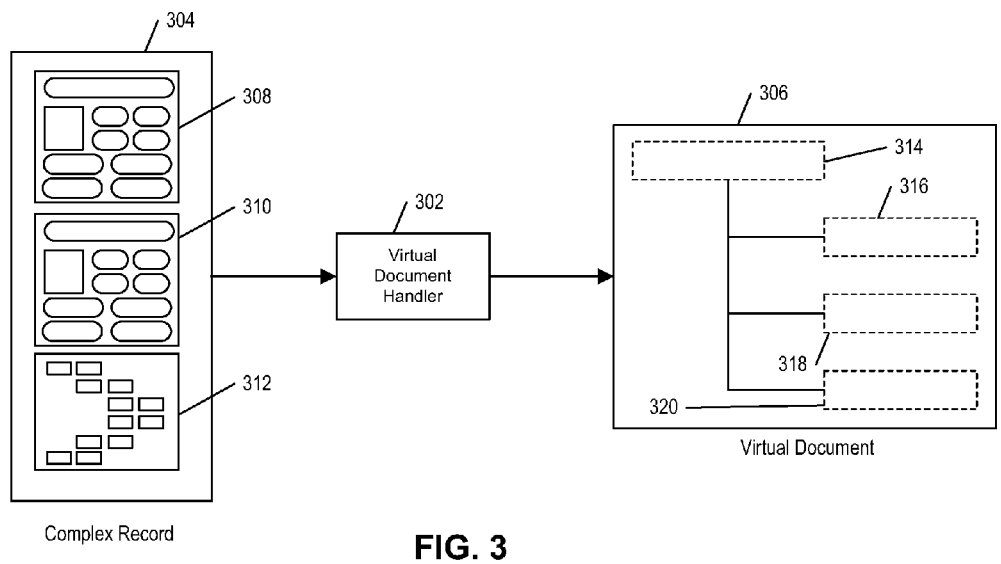

The virtual document handler component 214 may be used to create virtual documents in the central archival system 240. A virtual document may be created, for example, for a complex record. The virtual document handler component 214 may be invoked by the object injector component 208 for each injection of a complex record. For example and as shown in FIG. 3, a virtual document handler component 302 may be invoked when a complex record 304 is injected. The virtual document handler component 302 may create a virtual document 306 based on the complex record 304.

For example, the structure of the virtual document 306 may correspond to the structure of the complex record 304. The complex record 304 includes first content 308 (e.g., a document), second content 310, and structured data 312. The corresponding virtual document 306 includes a parent element 314 and child elements 316, 318, and 320, which correspond to the first content 308, the second content 310, and the structured data 312, respectively.

Returning to FIG. 2, the PDF processor component 216 may be used to queue documents for PDF rendering. For example, individual documents in a complex record or a document in a simple record may be queued for PDF rendering. The PDF processor component 216 may be invoked by the object injector component 208 after the injection of a record if PDF conversion options are configured for a record type corresponding to the injected record. The workflow handler component 220 may be used to initiate workflow processes in the central archival system 240. Workflow processes may be defined, for example, during definition of a record type. The workflow handler component 220 may be invoked by the object injector component 208 after the injection of a record if workflow initiation is configured for a record type corresponding to the injected record.

Figure 4:
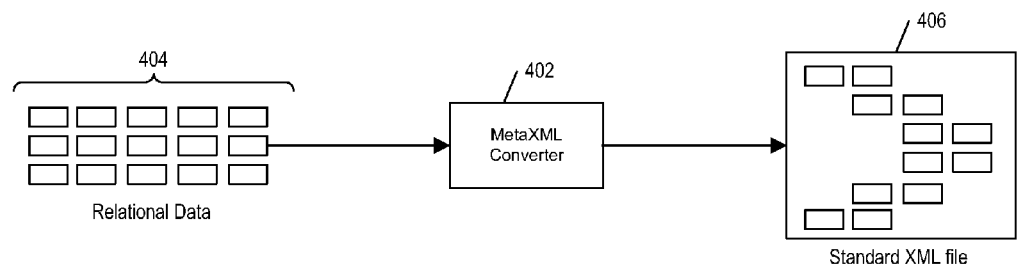

The meta-XML converter component 218 may be used to convert structured or relational data into an XML file. The meta-XML converter component 218 may be invoked by the injector component 208 if an injected record includes structured or relational information. For example and as shown in FIG. 4, a meta-XML converter component 402 may be invoked when a record which includes relational data 404 is injected. The meta-XML converter component 402 may create an XML file 406 based on the relational data 404. For example, the structure of the XML file 406 may correspond to the structure of the relational data 404.

Returning to FIG. 2, the object extractor component 212 handles extraction of objects (e.g., records) from the central archival system 240. If a complex record is extracted, the complex record may include one or more content items, where a content item may be a content file or may be an XML file or data stream which includes relational or structured information.

The configuration manager component 222 may be used to retrieve configuration information. For example, in some implementations, the configuration manager component 222 may retrieve and parse a configuration file (e.g., an XML configuration file), such as to extract configuration parameters. For example, configuration parameters may include class names of classes for other components included in the archival system connector module 202. The configuration manager component 222 may invoke some or all of the other components included in the archival system connector module 202. For example, the configuration manager component 222 may invoke the connection manager component 204 to establish a session with the central archival system 240 and may invoke the object injector component 208 in response to a request to inject a record. The object injector component 208 may invoke some or all of the taxonomy handler component 206, the metadata handler component 210, the virtual document handler component 214, the PDF processor component 216, the meta-XML converter component 218, and the workflow handler component 220, as part of injection processing.

Figure 5:
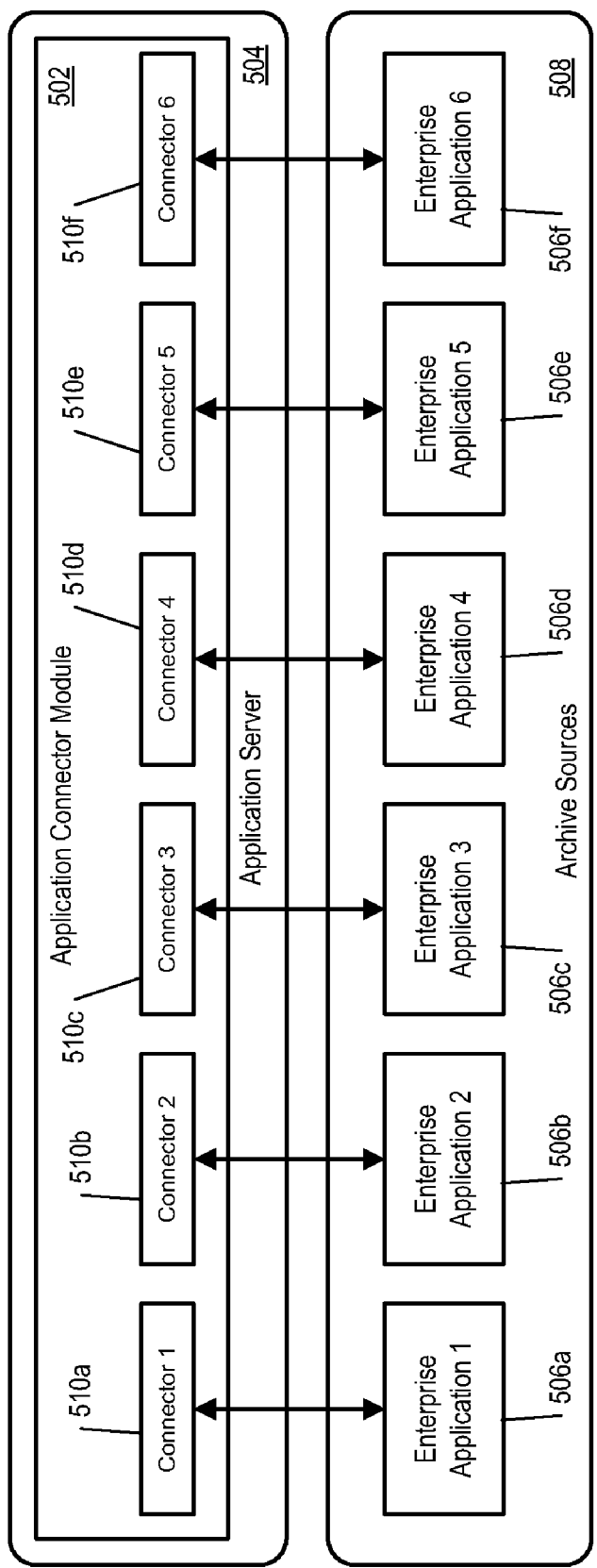

FIG. 5 illustrates an application connector module 502 included in an application server 504. The application connector module 502 may be, for example, an implementation of the application connector module 138 described above with respect to FIG. 1. The application connector module 502 enables the application server 504 to connect to multiple enterprise applications 506a-506f included in archive sources 508. The application connector module 502 includes a set of application connectors 510a-510e. Each application connector 510a-510e may be configured to interface with a different enterprise application 506a-506f, where each of the enterprise applications 506a-506f may be a different type of enterprise application. For example, the application connectors 510a-510f may be configured to interface with the enterprise applications 506a-506f, respectively. A new application connector 510 may be added to the application connector module 502 to support a new enterprise application 506.

Figure 6:
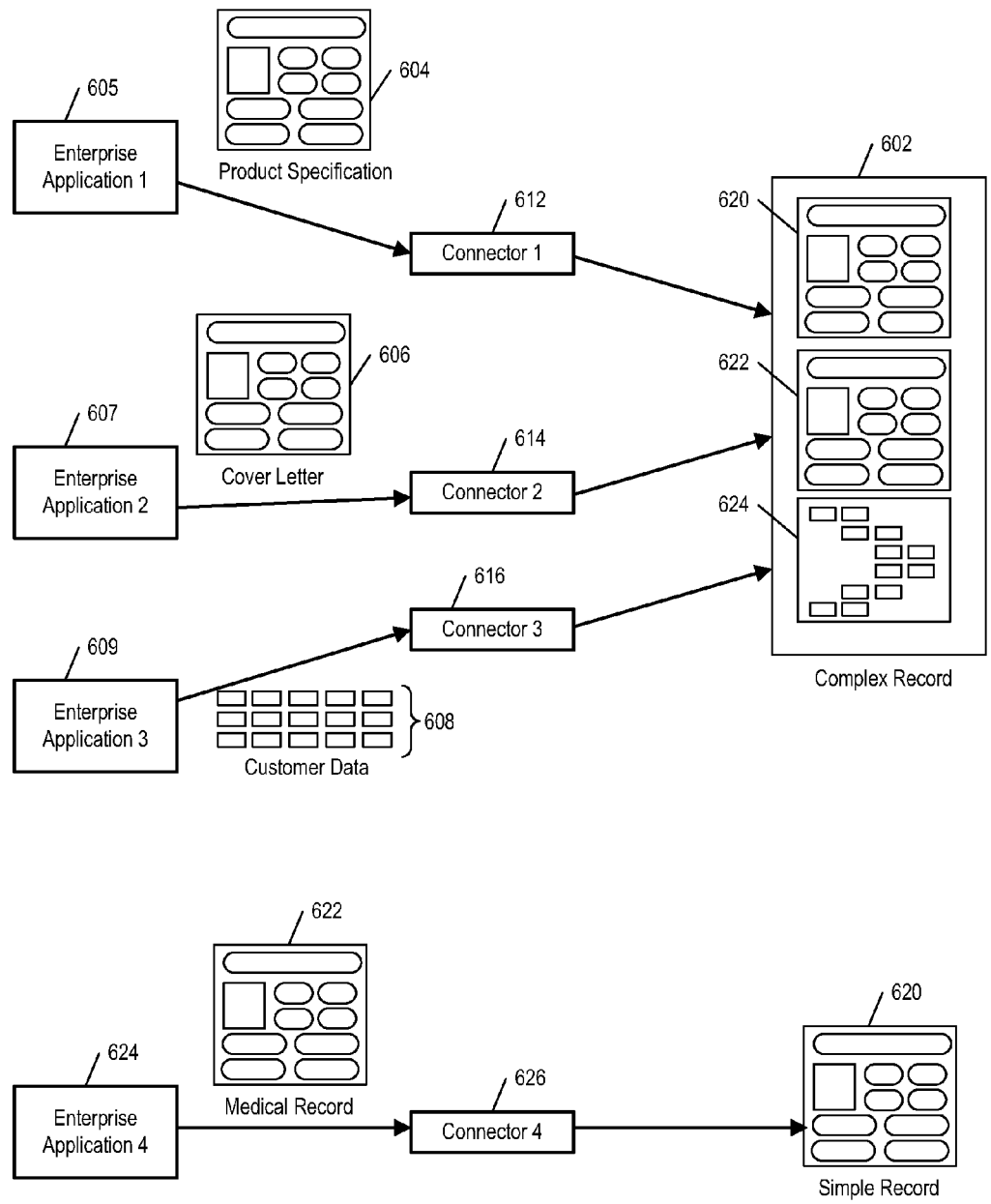

As discussed above, a complex record may include content from multiple archives sources. FIG. 6 illustrates an example complex record 602. The complex record 602 may include, for example, a product specification document 604 from a first enterprise application 605, a cover letter document 606 from a second enterprise application 607, and customer data 608 from a third enterprise application 609. The product specification document 604 may be retrieved from the first enterprise application 605 using a first application connector 612 configured to interface with the first enterprise application 605 and may exist in the complex record 602 as a first component 620. Similarly, the cover letter document 606 may be retrieved from the second enterprise application 607 using a second application connector 614 configured to interface with the second enterprise application 607 and may exist in the complex record 602 as a second component 622. The customer data 608 may be retrieved from the third enterprise application 609 using a third application connector 616 configured to interface with the third enterprise application 609. The customer data 608 may be converted to XML and may exist in the complex record 602 as a third component 624.

In contrast to a complex record, a simple record may be associated with one content item retrieved from one archival source. For example, a simple record 620 may be associated with a medical record 622 retrieved from a fourth enterprise application 624, using a fourth application connector 626 configured to interface with the fourth enterprise application 624.

Figure 7:
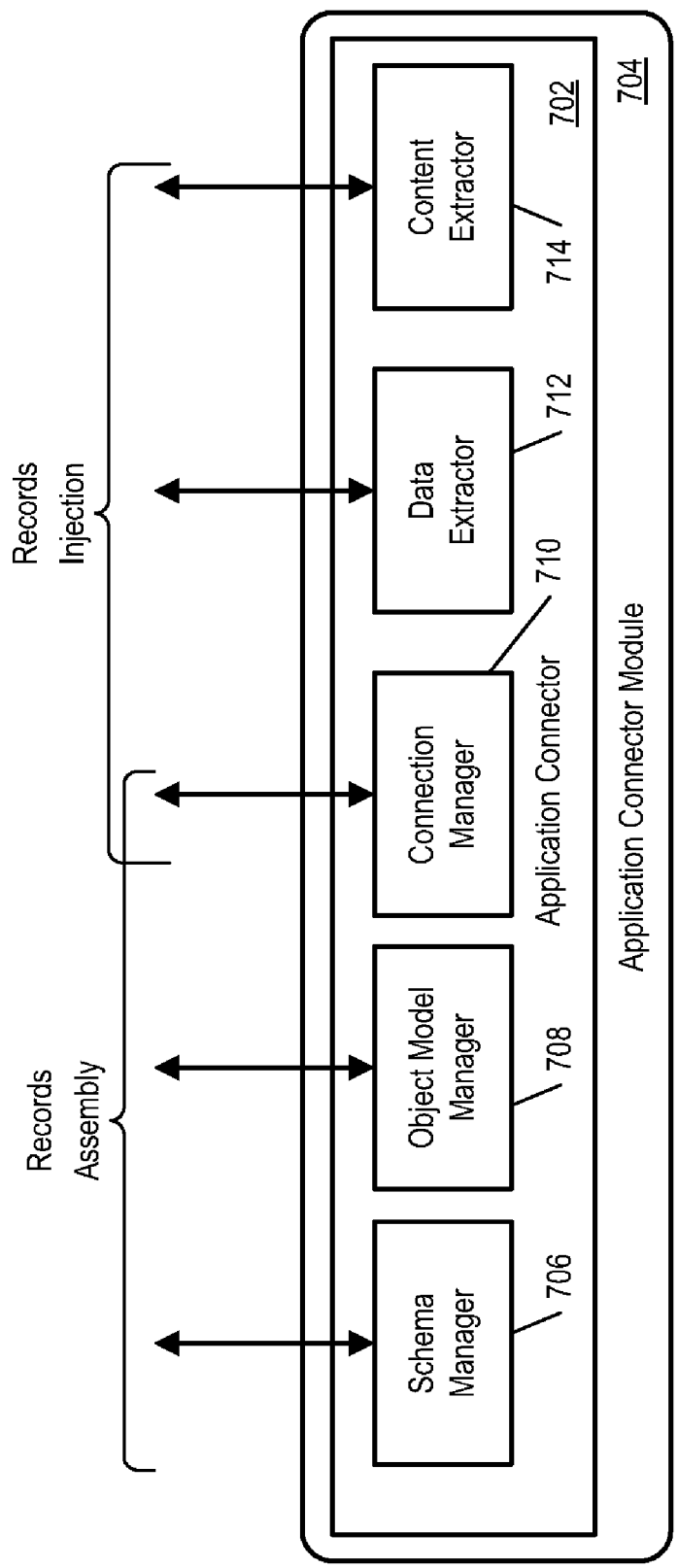
FIG. 7 is a diagram which illustrates an exemplary application connector module.

FIG. 7 illustrates an example application connector 702 included in an application connector module 704. The application connector 702 includes a schema manager component 706, an object model manager component 708, a connection manager component 710, a data extractor component 712, and a content extractor component 714. The connection manager component 710 may be used to manage a session with an enterprise application associated with the application connector 702. In some implementations, a first session may be established with the enterprise application for purposes of record assembly, and a second session may be established for record injection. In some implementations, the same session is used for both record assembly and record injection.

The schema manager component 706 may be used to extract details of a relational database schema or other schema used by an enterprise application associated with the application connector 702. The extracted schema information may include, for example, details about relational records stored in or accessible from the enterprise application associated with the application connector 702. The extracted schema information may be used when defining record types of records to be archived.

The object model manager component 708 may be used to extract details of one or more object models used in an enterprise content management system associated with the application connector 702 (e.g., the application connector 702 may be configured to interface with the enterprise content management system). Extracted object model information may include information about content stored in or accessible from the enterprise content management system associated with the application connector 702. A content schema for the enterprise content management system may be generated based on a set of object models. The extracted object model information may be used when defining record types of records to be archived.

The data extractor component 712 may be used to extract structured (e.g., relational) data from an enterprise system associated with the application connector 702. Extracted data may be treated as or may be included in a record and may be archived in a central archival system. The content extractor component 714 may be used to extract content and associated metadata stored in an enterprise content management system associated with the application connector 702. Extracted content may be treated as or may be included in a record and may be archived in a central archival system.

Figure 8:
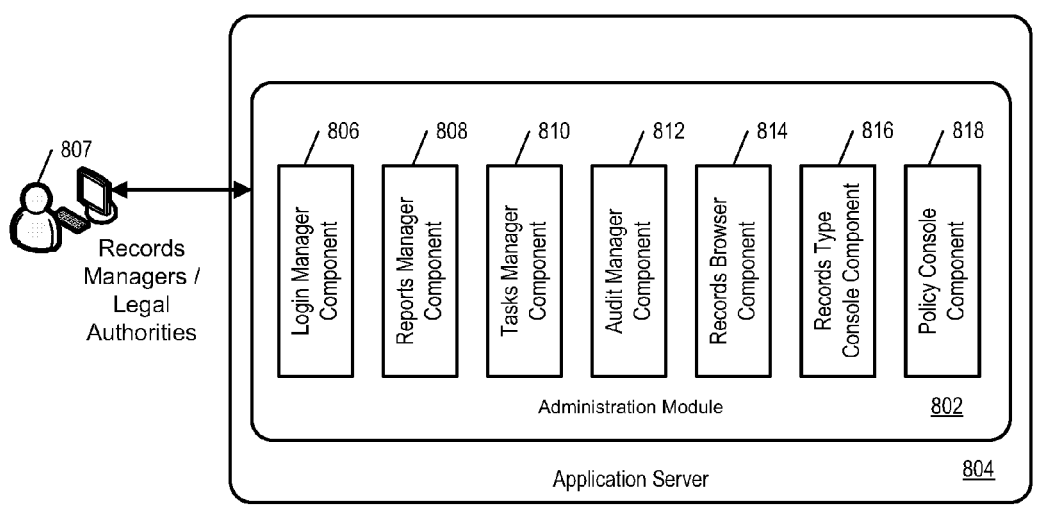

FIG. 8 illustrates an administration module 802 included in an application server 804. The administration module 802 may be, for example, an implementation of the administration module 130 described above with respect to FIG. 1. The administration module 802 includes a login manager component 806, a reports manager component 808, a tasks manager component 810, an audit manager component 812, a records browser component 814, a records type console component 816, and a policy console component 818.

The login manager component 806 may be used to provide functionality for records managers and legal authorities 807 to log into and log out of the application server 804. The records browser component 808 allows the records managers and legal authorities 807 to browse and search archived records. For example, the records managers and legal authorities 807 may use the records browser component 808 to perform records discovery by issuing keywords-based and/or metadata-based searches. The records managers and legal authorities 807 may also use the records browser component 808 to navigate one or more taxonomy folder structures. Selected records may be retrieved, if the user has appropriate authority.

The records type console component 816 may allow users to define and configure record types. The records managers and legal authorities 807 may use the records type console component 816 to define simple and complex record types. The records managers and legal authorities 807 may use the policy console component 818 to define record policies and to associate a defined policy with one or more record types. Defining policies is described in more detail below with respect to FIGS. 16 and 17.

The reports manager component 808 may be used to define and generate reports. A preconfigured report or custom report may be generated using report parameters, such as record creation time, record source, or record type, to name a few examples. The records managers and legal authorities 807 may use the tasks manager component 810 to view and perform archival or retrieval-related tasks. For example, the records managers and legal authorities 807 may review and approve incoming records before they are injected into a central archival system, or may review and approve the retrieval of the records from the central archival system. The audit manager component 812 may be used to define audit events for a particular record type and to view generated audit events. Auditing is described in more detail below with respect to FIGS. 20 and 21.

Figure 9:
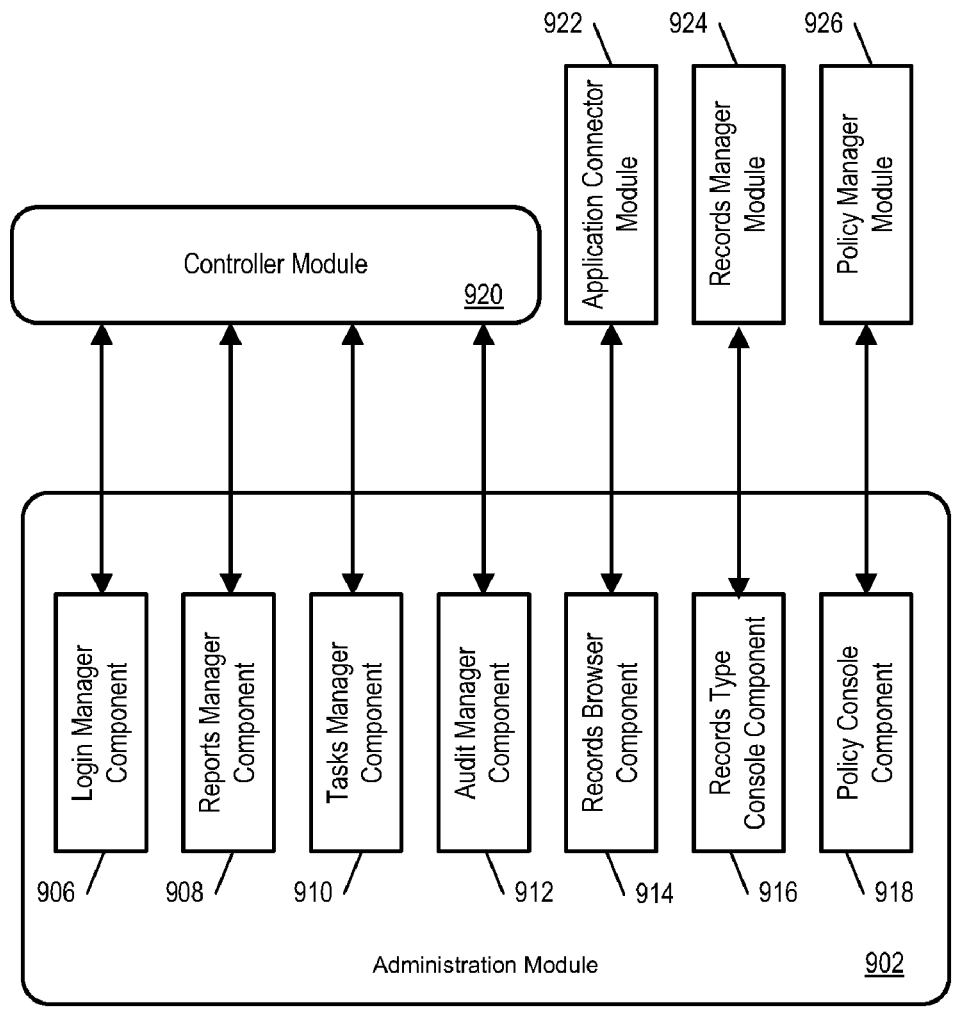

FIG. 9 illustrates interfaces of administration module components. Similar to the administration module 802 of FIG. 8, the administration module 902 includes a login manager component 906, a reports manager component 908, a tasks manager component 910, an audit manager component 912, a records browser component 914, a records type console component 916, and a policy console component 918. The login manager component 906, reports manager component 908, tasks manager component 910, and audit manager component 912 each may interface with a controller module 920. The controller module 920 may be, for example, an implementation of the controller module 136 described above with respect to FIG. 1.

The records browser component 914 may interface with an application connector module 922, the records type console component 916 may interface with a records manager module 924, and the policy console component 918 may interface with a policy manager component 926. The application connector module 922, the records manager module 924, and the policy manager component 926 may be implementations of the application connector module 138, the records manager module 132, and the policy manager module 134 described above with respect to FIG. 1, respectively.

Figure 10:
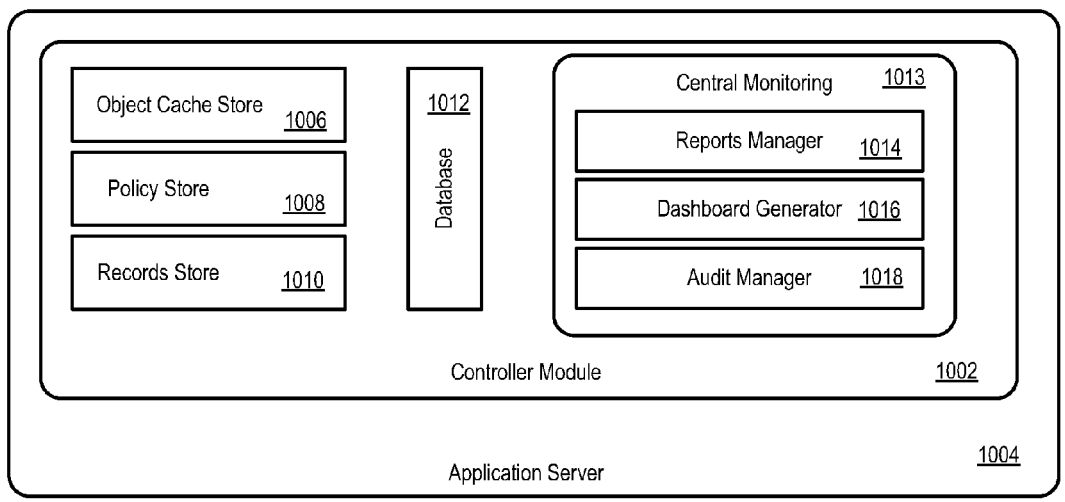
FIG. 10 is a diagram which illustrates an exemplary controller module.

FIG. 10 illustrates a controller module 1002 included in an application server 1004. The controller module 1002 may be an implementation of the controller module 136 described above with respect to FIG. 1. The controller module 1002 includes an object cache store 1006, a policy store 1008, a records store 1010, a database 1012, and a central monitoring component 1013.

The object cache store 1006 is a memory cache which may be used to cache received content and metadata as memory objects. Storing received content and metadata in memory in the object cache store 1006 may improve performance as compared to storing content and metadata in disk storage. Content may be cached in the object cache store 1006 and may subsequently be sent to the central archival system. The policy store 1008 may be used to store policy definitions and policy rules which may be included in one or more policy definitions. The records store 1010 may be used to store record and record type information, such as definitions of simple and complex record types, and other information used for records assembly. In some implementations, the policy store 1008 and/or the records store 1010 may use or include an in-memory cache and/or may use or may be associated with persistent storage associated with the database 1012.

The database 1012 may be used to store information such as logs, generated reports, report definitions, audit-related information, and other information. In some implementations, policy information may be cached in the policy store 1008 and may be also stored persistently in the database 1012. Similarly, in some implementations, record and record type information may be cached in the records store 1010 and may be also stored persistently in the database 1012.

The central monitoring component 1013 includes a reports manager component 1014, a dashboard generator component 1016, and an audit manager component 1018. The report manager component 1014 may access a central archival system to extract information about archived records, may consolidate the extracted information, and may generate reports based on the extracted information. The dashboard generator component 1016 may include a set of pre-configured chart definitions. The chart definitions may be used by the reports manager component 1014. For example, the reports manager component 1014 may populate a chart with data based on information queried from the central archival system and may display the chart on a report. The audit manager component 1018 may query the central archival system for audit trail objects based on a set of query parameters received from an audit manager component included in an administration module (e.g., the audit manager component 912 of the administration module 902 described above with respect to FIG. 9). The audit manager component 1018 may return query results to the audit manager component included in the administration module.

Figure 11:
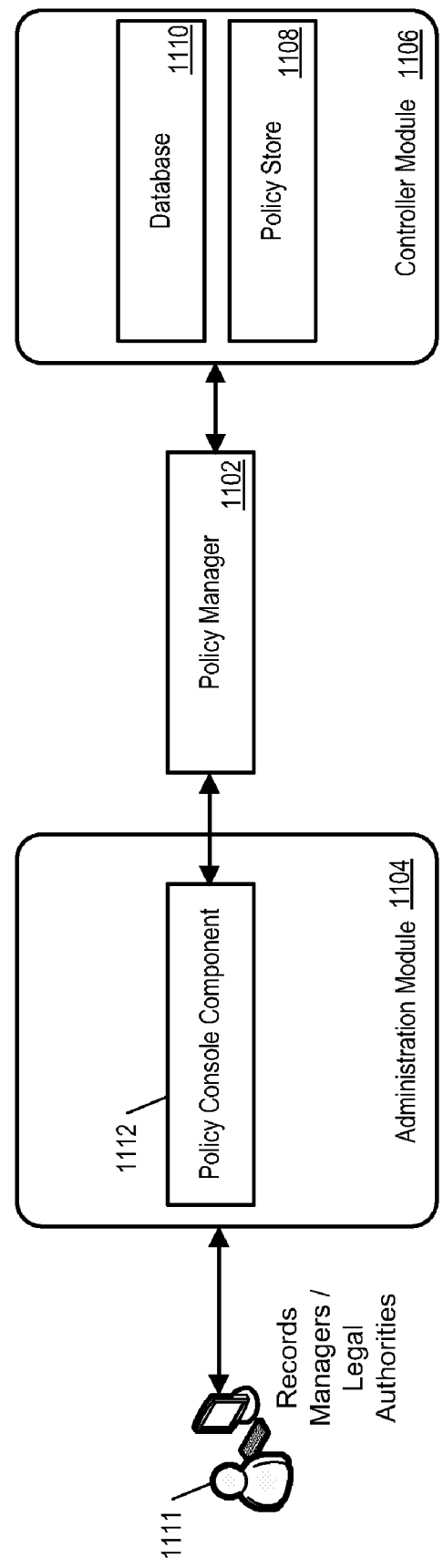

FIG. 11 illustrates interfaces for a policy manager module 1102. The policy manager module 1102 may interface with an administration module 1104 and with a controller module 1106. The policy manager module 1102, the administration module 1104, and the controller module 1106 may be implementations of the policy manager module 134, the administration module 130, and the controller module 136 described above with respect to FIG. 1. The policy manager module 1102 may be used, for example, to create a record policy, attach a record policy to an incoming record, version a record policy, remove a policy from an existing record, and delete a record policy. The policy manager module 1102 may communicate with the controller module 1106 to store policy information in a policy store 1108 included in the controller module 1106 and/or in a database 1110 included in the controller module 1106.

Records managers and legal authorities 1111 may use a policy console component 1112 included in the administration module 1104 to perform or initiate policy related operations. The policy console component 1112 may communicate user input and commands to the policy manager module 1102. In response to received user input and commands, the policy manager module 1102 may add, change, or delete policy information in the policy store 1108 and/or in the database 1110.

Figure 12:
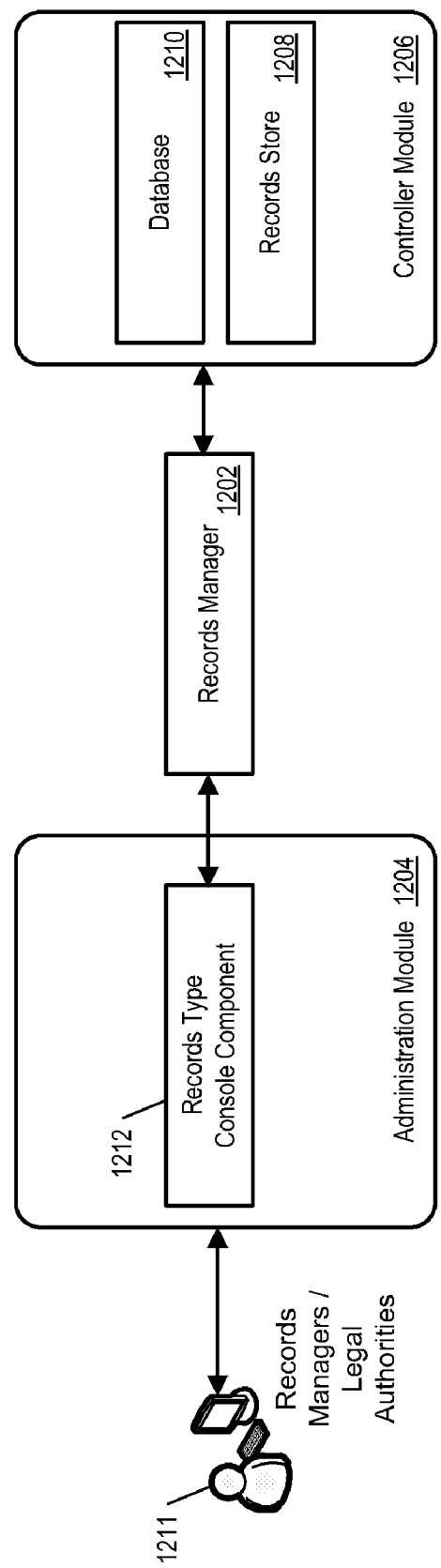

FIG. 12 illustrates interfaces for a records manager module 1202. The records manager module 1202 may interface with an administration module 1204 and with a controller module 1206. The records manager module 1202, the administration module 1204, and the controller module 1206 may be implementations of the records manager module 132, the administration module 130, and the controller module 136 described above with respect to FIG. 1. The records manager module 1202 may be used, for example, to create a simple record type, create a complex record type, associate a record type with a policy, delete a record type, review and approve incoming records, and retrieve records. The records manager module 1202 may communicate with the controller module 1206 to store record and record type information in a records store 1208 included in the controller module 1206 and/or in a database 1210 included in the controller module 1206.

Records managers and legal authorities 1211 may use a records type console component 1212 included in the administration module 1204 to perform or initiate records related operations. The records type console component 1212 may communicate user input and commands to the records manager module 1202. In response to received user input and commands, the records manager module 1202 may add, change, or delete records related information in the records store 1208 and/or in the database 1210.

Figure 13:
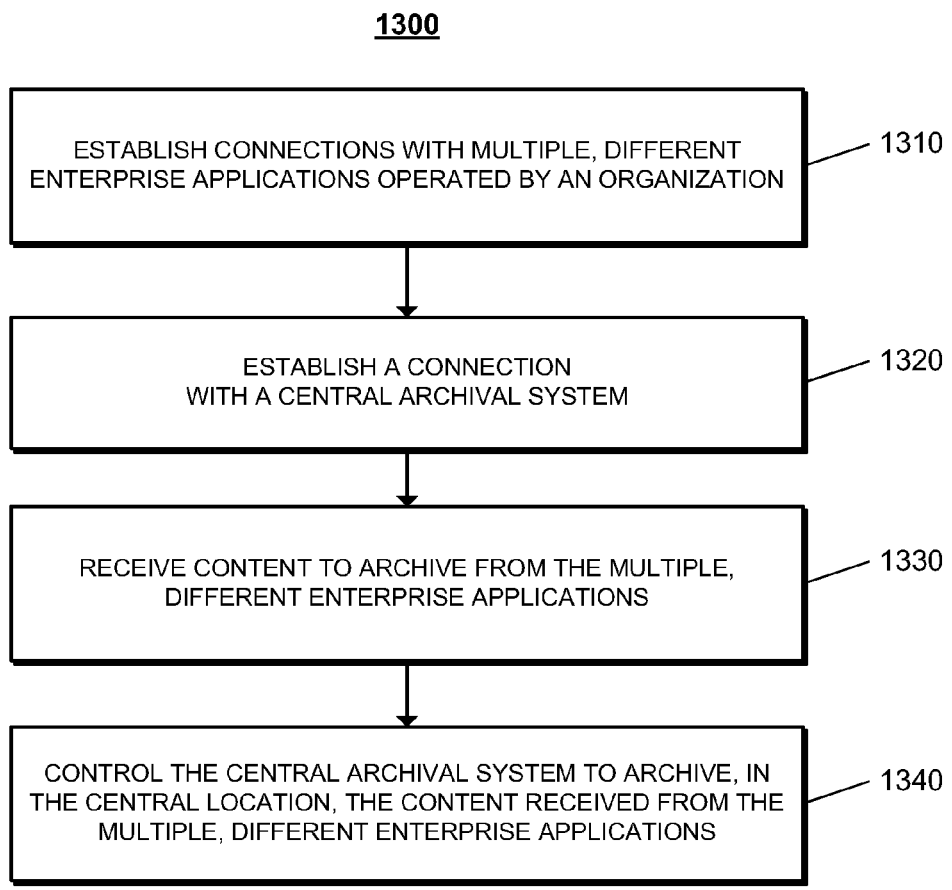
FIGS. 13, 14, 16, 18, and 20 are flowcharts of exemplary processes.

FIG. 13 illustrates an example process 1300 for archiving content from multiple, different types of enterprise applications in a central location. The operations of the process 1300 are described generally as being performed by the system 100. The operations of the process 1300 may be performed by one of the components of the system 100 (e.g., the application server 110) or may be performed by a combination of the components of the system 100. In some implementations, operations of the process 1300 may be performed by one or more processors included in one or more electronic devices.

The system 100 establishes connections with multiple, different enterprise applications operated by an organization (1310). For example, an applications connector module may be used, where the applications connector module includes multiple application connectors and where each application connector is configured to interface with a particular type of enterprise application. Each application connector may include a connection manager component which may be used to establish a connection with an associated enterprise application.

The system 100 establishes a connection with a central archival system (1320). For example, an archival system connector module may be used to establish a connection with the central archival system which is configured to archive content from the multiple, different enterprise applications in a central location. The archival system connector module may include a connection manager component which may be used to establish a session with the central archival system.

The system 100 receives content to archive from the multiple, different enterprise applications (1330). For example, for each enterprise application, an associated connector may be used to receive content to archive from the enterprise application. Content may include, for example, one or more documents, or structured or relational data. Content may be stored, for example in one or more caches of an application server, as one or more records. A record may be associated with a record type. A record type may be a simple record type or a complex record type. A simple record type may indicate that content for a simple record may be received from one enterprise application. A complex record type indicates that content for a complex record may be received from multiple, different enterprise applications.

The system 100 controls the central archival system to archive, in the central location, the content received from the multiple, different enterprise applications (1340). Some or all of the received content may be converted to a different format before archiving. For example, structural or relational database data may be converted to one or more XML files. A PDF version may be generated for some or all documents. For content for which a PDF document is made, either just the PDF document or both the PDF document and the original content may be archived.

Prior to archiving, a complex record type may be defined and the system 100 may handle archiving using the complex record type. For example, a complex record may be represented as a virtual document. Handling archiving using a complex record type is described in more detail below with respect to FIG. 14.

Figure 14:
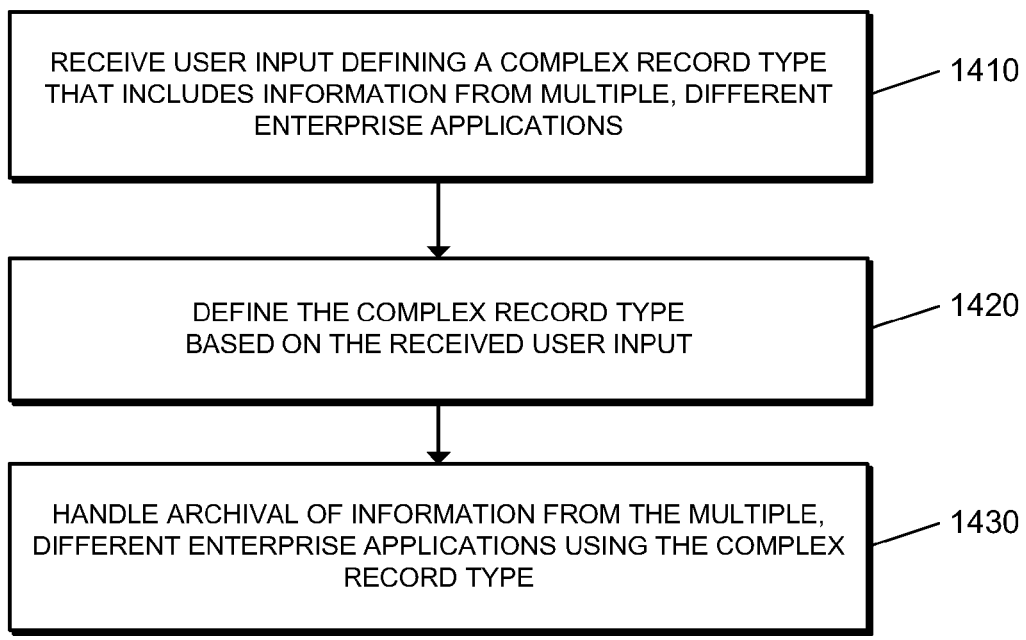

FIG. 14 illustrates an example process 1400 for archiving information from multiple, different enterprise applications using a complex record type. The operations of the process 1400 are described generally as being performed by the system 100. The operations of the process 1400 may be performed by one of the components of the system 100 (e.g., the application server 110) or may be performed by a combination of the components of the system 100. In some implementations, operations of the process 1400 may be performed by one or more processors included in one or more electronic devices.

Figure 15:
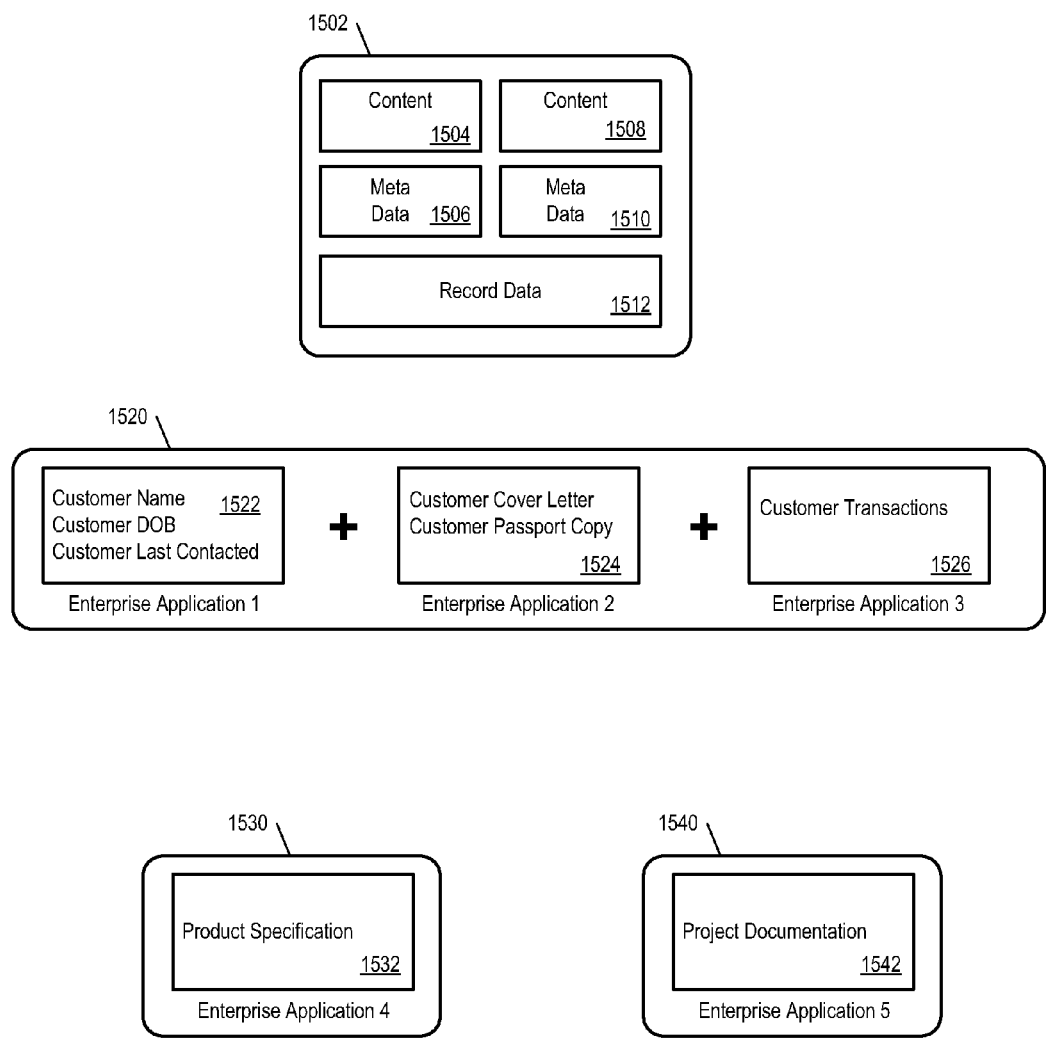
FIG. 15 is a diagram which illustrates an exemplary complex record type.

The system 100 receives user input defining a complex record type that includes information from multiple, different enterprise applications (1410). For example, a records manager or legal authority may provide user input using a records type console (e.g., the records type console 1212 described above with respect to FIG. 12). A record type may refer to content and/or metadata from multiple enterprise applications. For example, FIG. 15 illustrates a complex record type 1502 which is defined to include first content 1504 and first metadata 1506 from a first enterprise application and second content 1508 and second metadata 1510 from a second enterprise application. The complex record type 1502 also includes record data 1512 which describes other aspects of a record of the complex record type 1502.

As another example, a complex record type 1520 is defined to include a customer name, customer date of birth, and date last contacted information 1522 from a first enterprise application, a customer cover letter and a customer passport copy 1524 from a second enterprise application, and customer transaction information 1526 from a third enterprise application.

Simple record types may also be defined, where a simple record type is defined to include information from a single enterprise application. For example, a simple record type 1530 is defined to include product specification content 1532 from a fourth enterprise application and a simple record type 1540 is defined to include project documentation content 1542 from a fifth enterprise application.

Returning to FIG. 14, the system 100 defines the complex record type (1420). For example, a complex record type definition may be generated by a records manager module and the complex record type definition may be stored in a records store.

The system 100 handles archival of information from the multiple, different enterprise applications using the complex record type, based on the received user input (1430). For example, the system 100 may detect an archival operation that uses the complex record type and in response may identify content and metadata needed to populate the complex record type and may identify multiple enterprise applications from which to retrieve the identified content and identified metadata. The system 100 may connect to the identified enterprise applications to access the identified content and identified metadata. The system 100 may control, using an archival system connector, a central archival system to store, in a single record of the complex record type, the accessed content and the accessed metadata.

Figure 16:
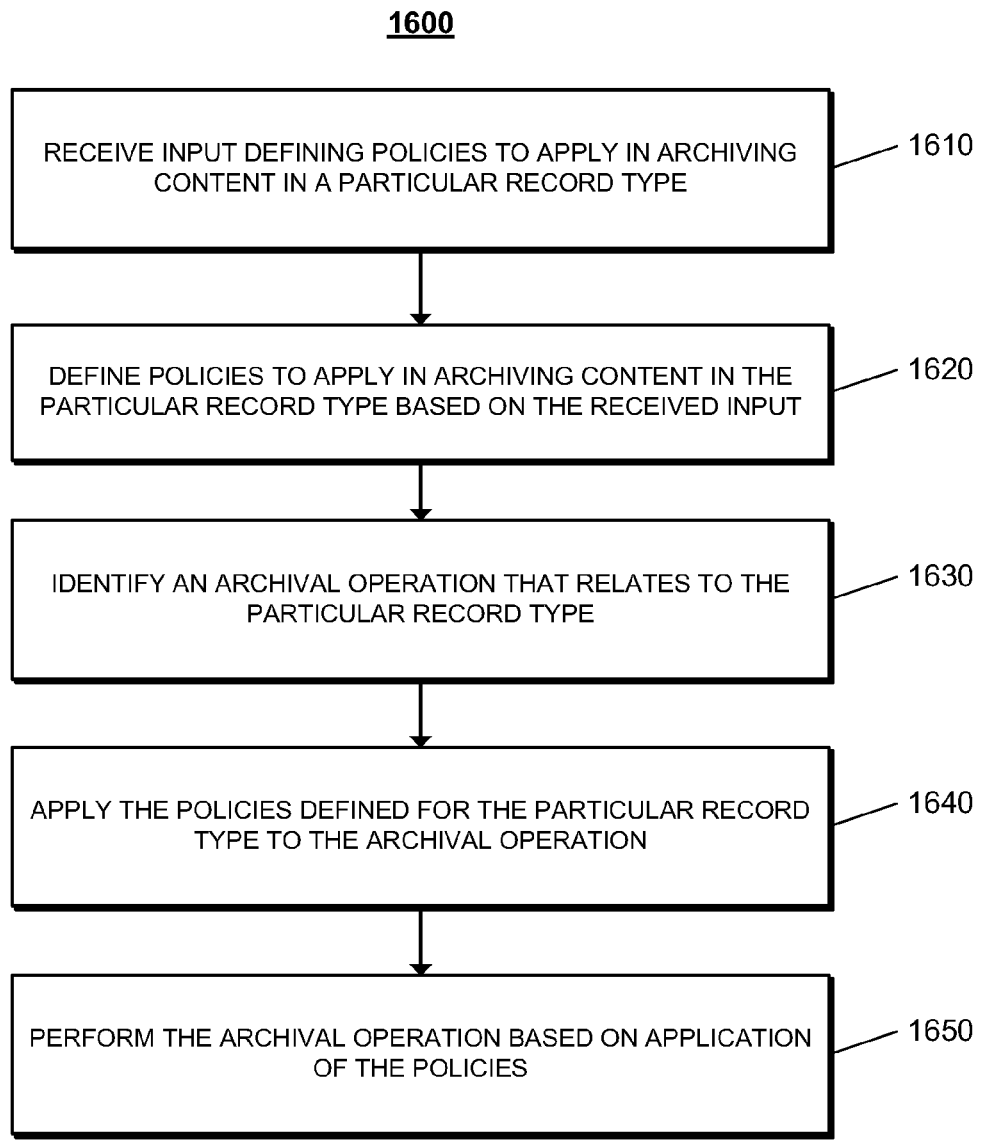

FIG. 16 illustrates an example process 1600 for defining and applying archival policies. The operations of the process 1600 are described generally as being performed by the system 100. The operations of the process 1600 may be performed by one of the components of the system 100 (e.g., the application server 110) or may be performed by a combination of the components of the system 100. In some implementations, operations of the process 1600 may be performed by one or more processors included in one or more electronic devices.

The system 100 receives input defining policies to apply in archiving content in a particular record type (1610). For example, a records manager or legal authority may provide user input specifying one or more policy rules to apply in archiving content in a particular record type using a policy console component (e.g., the policy console 1112 described above with respect to FIG. 11). As shown in FIG. 17, example policy rules 1700 may be based on a record type, may involve one or more pre-ingestion handlers (e.g., a handler may be called before a record is injected), may involve one or more post-ingestion handlers (e.g., a handler may be called after a record is injected), may involve PDF conversion, may involve applying an archive system lifecycle stage, may involve initiating an archive system workflow, may be based on or may refer to an archive system target folder, may be based on or may refer to one or more retention phases, may involve one or more pre-retrieval handlers (e.g., a handler may be called before a record is retrieved), may involve one or more post-retrieval handlers (e.g., a handler may be called after a record is retrieved), and may involve deletion of a record.

The system 100 defines policies to apply in archiving content in the particular record type based on the received input (1620). For example, a policy definition may be generated by a policy manager module and the policy definition may be stored in a policy store.

The system 100 identifies an archival operation that relates to the particular record type (1630). For example, a request to archive content related to the particular record type may be received. As another example, a request to retrieve content related to a particular record type may be received.

The system 100 applies the policies defined for the particular record type to the archival operation (1640) and the system 100 performs the archival operation based on application of the policies (1650). Policy rules may be applied by invoking one or more handlers. For example, a pre-ingestion handler may be invoked before a record is injected and a post-ingestion handler may be invoked after a record is injected. A pre-retrieval handler may be invoked before a record is retrieved and a post-retrieval handler may be invoked after a record is retrieved.

Policies may be based on or may refer to one or more lifecycle states of a record. A record may be in one or more of the following states: draft, in-review, in-workflow, approved, archived, retrieved, deleted, and PDF-generated. Some of the lifecycle states are mutually exclusive (e.g., a record may not be simultaneously in an in-review and a deleted state) and some combinations of the lifecycle states may be simultaneously applicable to a record (e.g., a record may be both approved and retrieved).

Figure 18:
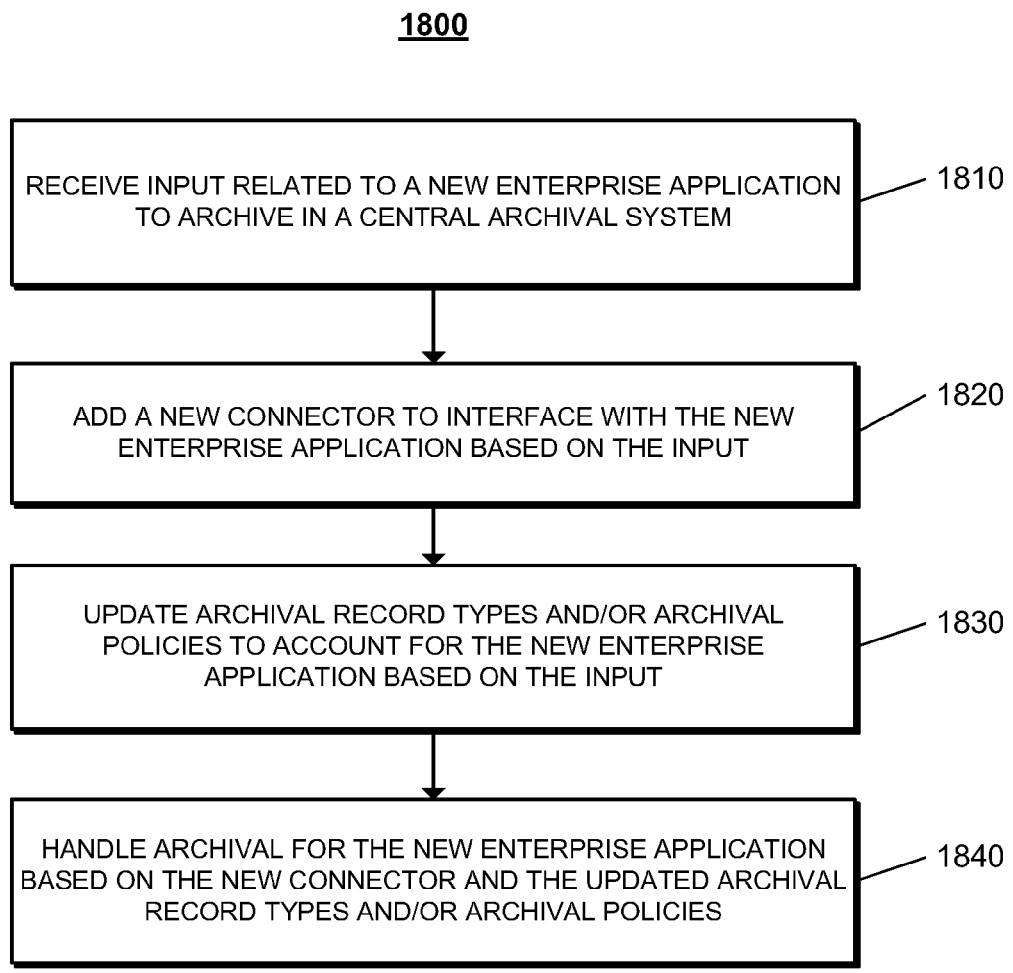

FIG. 18 illustrates an example process 1800 for archiving information from a new enterprise application. The operations of the process 1800 are described generally as being performed by the system 100. The operations of the process 1800 may be performed by one of the components of the system 100 (e.g., the application server 110) or may be performed by a combination of the components of the system 100. In some implementations, operations of the process 1800 may be performed by one or more processors included in one or more electronic devices.

Figure 19:
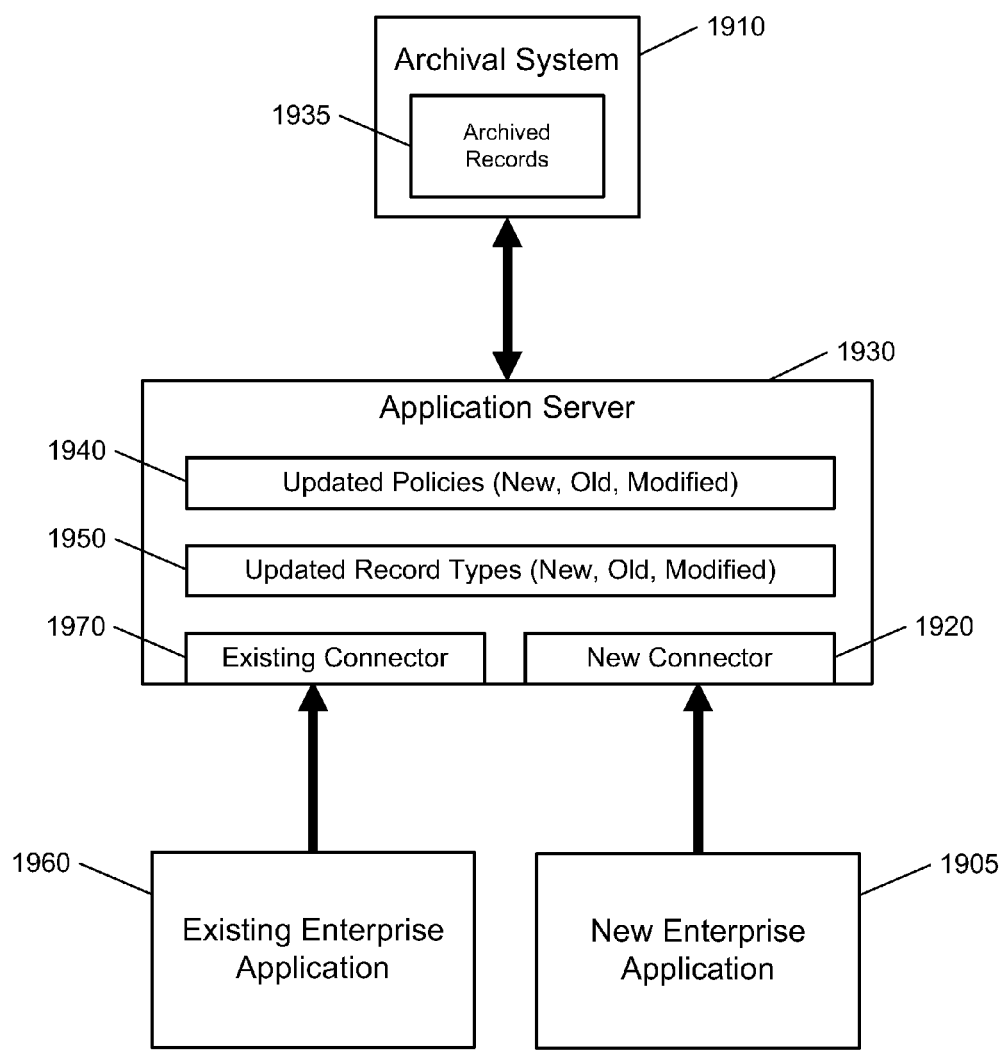

The system 100 receives input related to a new enterprise application to archive in a central archival system (1810). For example, the new enterprise application may be a new enterprise application product offering or may otherwise be an enterprise application for which content has not previously been archived in the central archival system. As shown in FIG. 19, a company may begin using a new enterprise application 1905 and may wish to integrate the new enterprise application 1905 with an archival system 1910 used by the company.

The system 100 adds a new connector to interface with the new enterprise application based on the input (1820). The new connector may be implemented, configured to interface with the new enterprise application, and may be added to an application connector module. In the example of FIG. 19, a new connector 1920 is added to an application server 1930.

The system 100 updates archival record types and/or archival policies to account for the new enterprise application based on the input (1830). For instance, in the example of FIG. 19, after updating archival record types and archival policies, the application server 1930 may include updated policies 1940 and updated record types 1950. The updated policies 1940 may include new policies added to support the new enterprise application 1905, modified policies changed to support the new enterprise application 1905, and old policies left unchanged after accounting for the new enterprise application 1905. Similarly, the updated record types 1950 may include new record types added to support the new enterprise application 1905, modified record types changed to support the new enterprise application 1905, and old record types left unchanged after accounting for the new enterprise application 1905.

Returning to FIG. 18, the system 100 handles archival for the new enterprise application based on the new connector and the updated archival record types and/or archival policies (1840). For instance, in the example of FIG. 19, a request to archive information from the new enterprise application 1905 may be received by the application server 1930. The application server 1930 may connect to the new enterprise application 1905 using the new connector 1920, may retrieve content from the new enterprise application 1905 using the new connector 1920, and may inject the retrieved content into the archival system 1910, for example in archived records 1935 included in the archival system 1910.

After the addition of the new enterprise application 1905, the application server 1930 may receive a request to archive content from an existing enterprise application 1960. In response to such a request, the application server 1930 may connect to the existing enterprise application 1960 using an existing connector 1970, may retrieve content from the existing enterprise application 1960 using the existing connector 1970, and may inject the retrieved content into the archival system 1910. The operations may be performed as had occurred prior to the addition of the new enterprise application 1905. In other words, addition of the new enterprise application 1905 does not impact archival of content from the existing enterprise application 1960. The updated policies 1940 and updated record types 1950 may include policies and record types, respectively, that are used in archiving content from the existing enterprise application 1960, where those policies and record types may be maintained as unchanged in response to adding support for the new enterprise application 1905.

Figure 20:
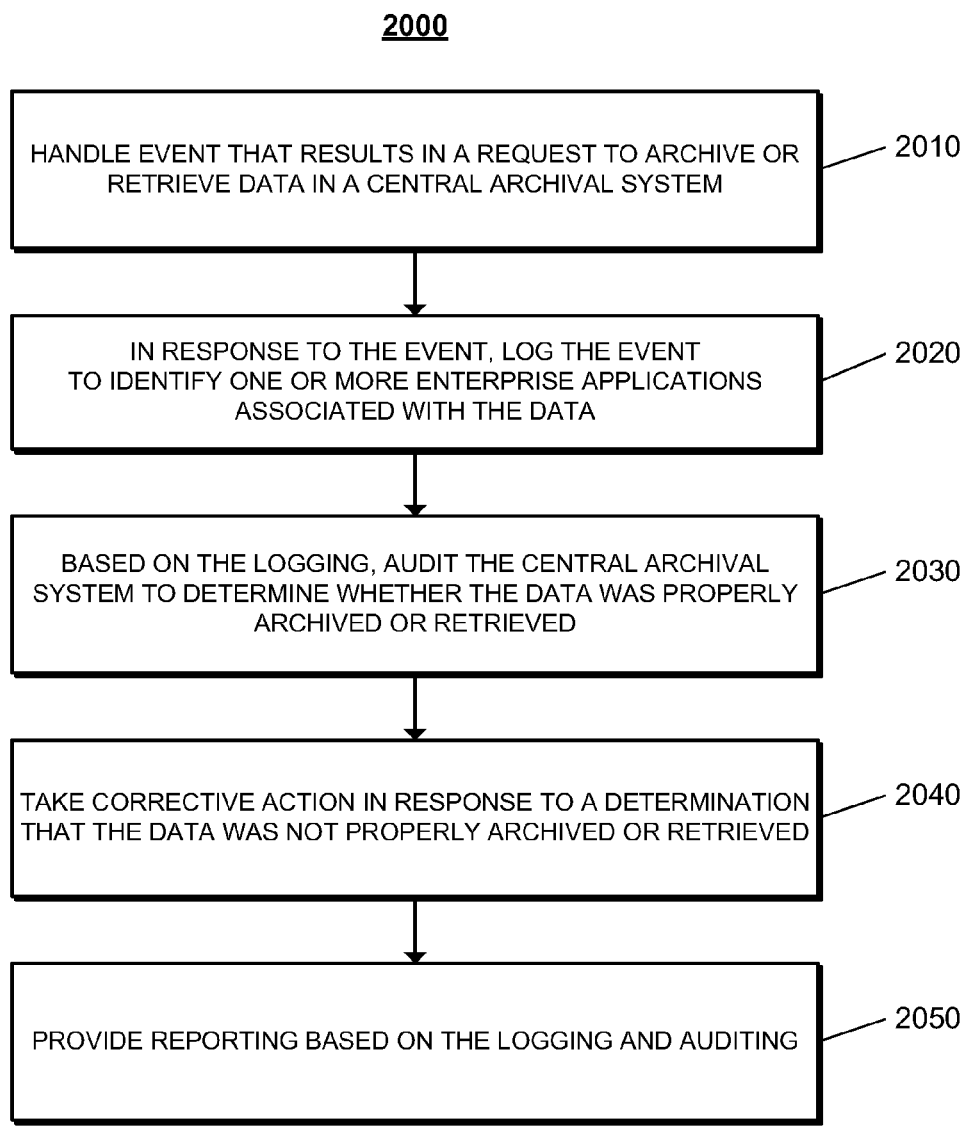

FIG. 20 illustrates an example process 2000 for auditing archival operations. The operations of the process 2000 are described generally as being performed by the system 100. The operations of the process 2000 may be performed by one of the components of the system 100 (e.g., the application server 110) or may be performed by a combination of the components of the system 100. In some implementations, operations of the process 2000 may be performed by one or more processors included in one or more electronic devices.

The system 100 handles an event that results in a request to archive or retrieve data in a central archival system (2010). For example, as shown in FIG. 21, example events that may be audited include: record type creation, modification, or deletion; policy creation, modification, or deletion; structural/relational data archival; other content archival; records assembly or retrieval; policy enforcement, policy removal and policy phase changes; records lifecycle changes; workflow triggering; PDF generation; records deletion; and virtual document creation.

In response to the event, the system 100 logs the event to identify one or more enterprise applications associated with the data (2020). For example, data associated with the event may be logged to a database. Logged data may include, for example, an event time, an identity of one or more applicable enterprise applications, an applicable record type, an event description, and an event type. Data may be logged in electronic storage which is separate from the central archival system (e.g., electronic storage included in a different physical machine located in a different geographic location).

The system 100 audits, based on the logging, the central archival system to determine whether the data was properly archived or retrieved (2030). For example, the system 100 may analyze log data to determine a set of records identified to be archived. The system 100 may compare the set of records identified to be archived with the current records included in the central archival system (accounting for records which have been deleted from the central archival system (e.g., as indicated by log data)). If each record identified to be archived is found in the central archival system, the system 100 may determine that data was properly archived. If some of the records identified to be archived cannot be found in the central archival system, the system 100 may determine that data was not properly archived.

The system 100 takes corrective action in response to a determination that the data was not properly archived or retrieved (2040). For example, one or more parties may be notified, such as administrators, records managers, or one or more requestors of archival operations for which data was not properly archived. As another example, archival of records not properly archived may be reattempted.

The system 100 provides reporting based on the logging and auditing (2050). For example, the system 100 may calculate, based on the logging and auditing, archival statistics related to archival operations performed for each of the multiple, different enterprise applications and success or failure of the archival operations. A reports manager module may generate and output a report that reflects the calculated archival statistics.

Figure 22:
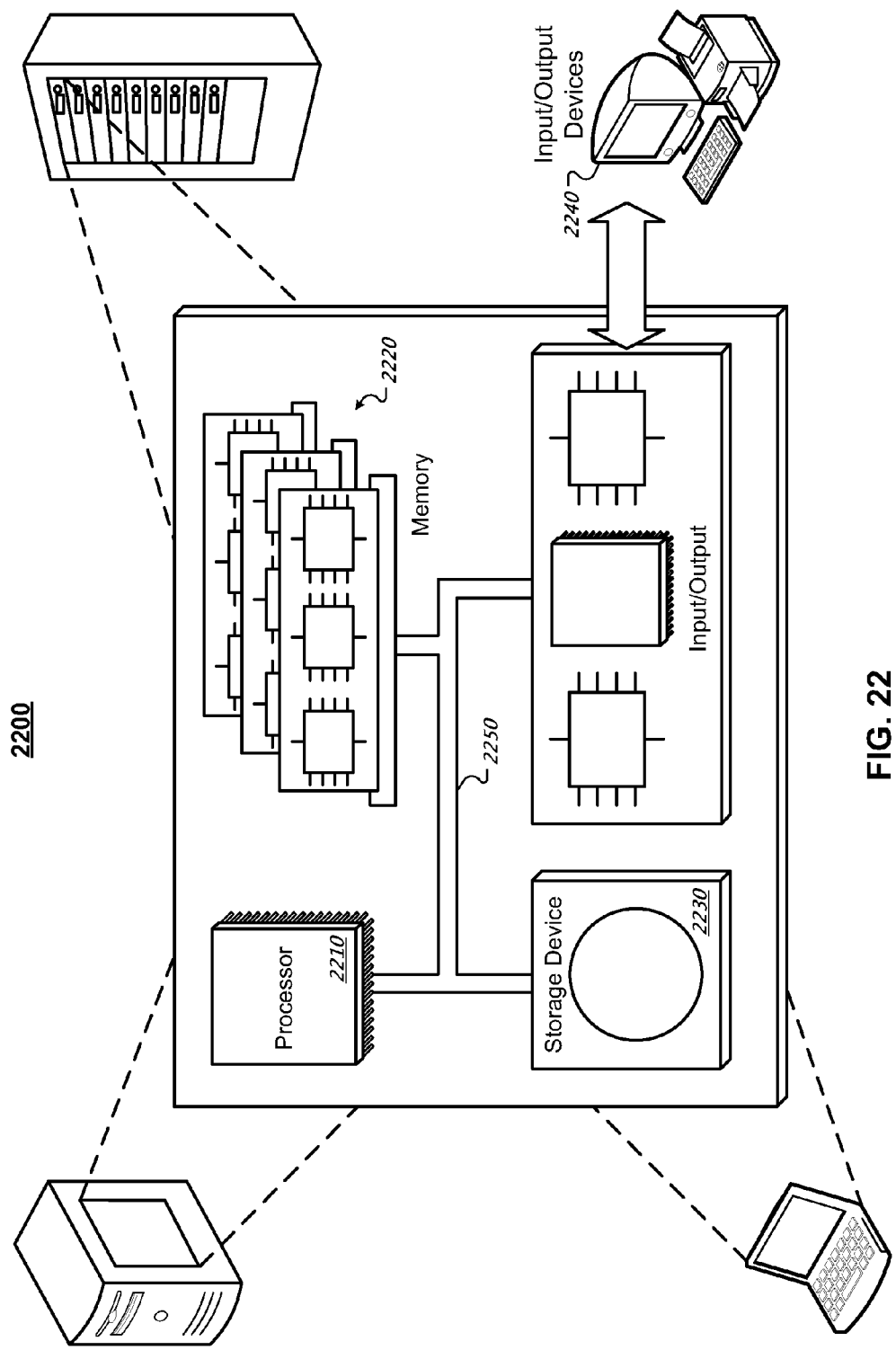

FIG. 22 is a schematic diagram of an example of a computer system 2200. The system 2200 can be used for the operations described in association with the processes 1300, 1400, 1600, 1800, and 2000, according to one implementation.

The system 2200 includes a processor 2210, a memory 2220, a storage device 2230, and an input/output device 2240. Each of the components 2210, 2220, 2230, and 2240 are interconnected using a system bus 2250. The processor 2210 is capable of processing instructions for execution within the system 2200. In one implementation, the processor 2210 is a single-threaded processor. In another implementation, the processor 2210 is a multi-threaded processor. The processor 2210 is capable of processing instructions stored in the memory 2220 or instructions stored on the storage device 2230 to display graphical information for a user interface on the input/output device 2240.

The memory 2220 stores information within the system 2200. In one implementation, the memory 2220 is a computer-readable medium. In one implementation, the memory 2220 is a volatile memory unit. In another implementation, the memory 2220 is a non-volatile memory unit.

The storage device 2230 is capable of providing mass storage for the system 2200. In one implementation, the storage device 2230 is a computer-readable medium. In various different implementations, the storage device 2230 may be a floppy disk device, a hard disk device, an optical disk device, or a tape device.

The input/output device 2240 provides input/output operations for the system 2200. In one implementation, the input/output device 2240 includes a keyboard and/or pointing device. In another implementation, the input/output device 2240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system for archiving content from multiple, different types of enterprise applications in a central location, the system comprising:

multiple, different application connectors that are configured to interface with multiple, different enterprise applications operated by an organization, the multiple, different application connectors including at least:
   a first application connector configured to interface with a first type of enterprise application operated by the organization, and
   a second application connector configured to interface with a second type of enterprise application operated by the organization, the second type of enterprise application being different than the first type of enterprise application;

an archival system connector that is configured to interface with a central archival system, the central archival system being configured to archive content from the multiple, different enterprise applications in a central location; and an application server that is configured to receive, using the multiple, different application connectors, content to archive from the multiple, different enterprise applications, and control, using the archival system connector, the central archival system to archive, in the central location, the content received from the multiple, different enterprise applications such that content from the first type of enterprise application is archived together in the central location with content from the second type of enterprise application, wherein the application server includes a computer system and is further configured to:
   receive user input defining a complex record type that includes information from the multiple, different enterprise applications;
   define the complex record type based on the received user input;
   detect an archival operation that uses the complex record type;
   in response to detection of the archival operation that uses the complex record type, identify content needed from the multiple, different enterprise applications to populate the complex record type and identify metadata needed from the multiple, different enterprise applications to populate the complex record type;
   access the identified content and the identified metadata; and
   control, using the archival system connector, the central archival system to store, in a single record of the complex record type, the accessed content and the accessed metadata.

2. The system of claim 1, wherein the application server is configured to provide a standard user interface that enables a user to provide input to control archival operations for the multiple, different enterprise applications and the central archival system, receive user input that is entered into the standard user interface, and control, based on the received user input, archival operations for the multiple, different enterprise applications and the central archival system.

3. The system of claim 1, wherein the application server is configured to convert, into a different format, at least a portion of the content received from the multiple, different enterprise applications prior to controlling the central archival system to archive, in the central location, the content received from the multiple, different enterprise applications.

4. The system of claim 1:
wherein the complex record type includes first content from a first enterprise application, first metadata from the first enterprise application, second content from a second enterprise application, second metadata from the second enterprise application, and record data that describes aspects of a record of the complex record type, the second enterprise application being different than the first enterprise application, the first content being different than the second content, and the first metadata being different than the second metadata; and
wherein the application server is configured to create a single record of the complex record type by integrating, into the single record of the complex record type, the first content from the first enterprise application, the first metadata from the first enterprise application, the second content from the second enterprise application, and the second metadata from the second enterprise application and adding, to the single record of the complex record type and in the record data portion of the complex record type, data describing aspects of creation of the single record.

5. The system of claim 1, wherein the application server is configured to:
handle an event that results in a request to at least one of archive data in the central archival system and retrieve data from the central archival system; and
in response to the event, log, in electronic storage separate from the central location of the central archival system, the event to identify data associated with the event and one or more of the multiple, different enterprise applications associated with the event.

6. The system of claim 5, wherein the application server is configured to, based on the logging, audit the central archival system to determine whether the data was properly archived.

7. The system of claim 6, wherein the application server is configured to, in response to a determination that the data was not properly archived, take corrective action with respect to the central archival system to cause proper archival of the data in the central location.

8. The system of claim 6, wherein the application server is configured to:
calculate, based on the logging and auditing, archival statistics related to archival operations performed for each of the multiple, different enterprise applications and success or failure of the archival operations;
generate a report that reflects the calculated archival statistics; and
output, using an output device, the report.

9. The system of claim 5, wherein the application server is configured to:
handle an archival event that results in a request to archive data in the central archival system; and
in response to the archival event, log, in electronic storage separate from the central location of the central archival system, the archival event to identify data archived as part of the archival event and one or more of the multiple, different enterprise applications providing the data archived as part of the archival event.

10. The system of claim 5, wherein the application server is configured to:
handle a retrieval event that results in a request to retrieve data from the central archival system; and
in response to the retrieval event, log, in electronic storage separate from the central location of the central archival system, the retrieval event to identify data retrieved as part of the retrieval event and one or more of the multiple, different enterprise applications providing the data retrieved as part of the retrieval event.

11. The system of claim 1, wherein the application server is configured to:
receive input related to a new enterprise application to archive in the central archival system;
add a new application connector to interface with the new enterprise application based on the input;
update archival record types and archival policies to account for the new enterprise application based on the input; and
handle archival for the new enterprise application based on the new application connector and the updated archival record types and archival policies.

12. The system of claim 11, wherein the application server is configured to maintain an existing application connector used by a previous enterprise application whose content was previously being archived in the central archival system, existing archival record types used in archiving content from the previous enterprise application, and existing archival policies used in archiving content from the previous enterprise application such that addition of the new enterprise application does not impact archival of content from the previous enterprise application.

13. The system of claim 1, wherein the application server is configured to:
receive user input defining one or more policies to apply in archiving content in a particular record type, the particular record type being used to archive content from multiple, different enterprise applications; and
based on the received input, define, in electronic storage, the one or more policies to apply in archiving content in the particular record type, the one or more policies being applicable to archiving content from all of the multiple, different enterprise applications whose content is archived in the particular record type.

14. The system of claim 13, wherein the application server is configured to:
identify an archival operation that relates to the particular record type;
apply the one or more policies defined for the particular record type to the archival operation based on the identification of the archival operation as relating to the particular record type; and
perform the archival operation that relates to the particular record type based on application of the one or more policies.

15. The system of claim 13, wherein the application server is configured to:
receive user input defining a retention policy to apply in archiving content in the particular record type; and based on the received input, define, in electronic storage, the retention policy to apply in retaining content archived in the particular record type.

16. The system of claim 13, wherein the application server is configured to:
receive user input defining a location policy to apply in archiving content in the particular record type, the location policy defining a location within the central archival system at which to store content archived using the particular record type; and
based on the received input, define, in electronic storage, the location policy to apply in determining the location within the central archival system at which to store content archived using the particular record type.

17. The system of claim 1:
wherein the complex record type includes a first type of information from a first enterprise application, a second type of information from a second enterprise application, and a third type of information from a third enterprise application,
wherein the first type of information is different from the second type of information and the third type of information,
wherein the second type of information is different from the third type of information,
wherein the first enterprise application is different from the second enterprise application and the third enterprise application,
wherein the second enterprise application is different from the third enterprise application, and
wherein the application server is configured to control the central archival system to store, in the single record of the complex record type, the accessed content and the accessed metadata by controlling the central archival system to store, in the single record of the complex record type, the first type of information from the first enterprise application, the second type of information from the second enterprise application, and the third type of information from the third enterprise application.

18. The system of claim 1, wherein the application server is configured to control the central archival system to store, in the single record of the complex record type, the accessed content and the accessed metadata by:
controlling the central archival system to store, in the single record of the complex record type, metadata accessed from at least two enterprise applications,
determining record data that describes aspects of the single record of the complex record type, and
controlling the central archival system to store, in the single record of the complex record type, the determined record data with the metadata accessed from at least two enterprise applications.

19. A computer-implemented method of archiving content from multiple, different types of enterprise applications in a central location, the method comprising:
establishing, using multiple, different application connectors, connections with multiple, different enterprise applications operated by an organization, the multiple, different application connectors including at least:
a first application connector configured to interface with a first type of enterprise application operated by the organization, and
a second application connector configured to interface with a second type of enterprise application operated by the organization, the second type of enterprise application being different than the first type of enterprise application;
establishing, using an archival system connector, a connection with a central archival system, the central archival system being configured to archive content from the multiple, different enterprise applications in a central location;
receiving, over the connections established using the multiple, different application connectors, content to archive from the multiple, different enterprise applications; and
controlling, by a computer system using the archival system connector, the central archival system to archive, in the central location, the content received from the multiple, different enterprise applications such that content from the first type of enterprise application is archived in the central location together with content from the second type of enterprise application,
wherein controlling the central archival system to archive, in the central location, the content received from the multiple, different enterprise applications comprises:
receiving user input defining a complex record type that includes information from the multiple, different enterprise applications;
defining the complex record type based on the received user input;
detecting an archival operation that uses the complex record type;
in response to detection of the archival operation that uses the complex record type, identifying content needed from the multiple, different enterprise applications to populate the complex record type and identifying metadata needed from the multiple, different enterprise applications to populate the complex record type;
accessing the identified content and the identified metadata; and
controlling, by the computer system using the archival system connector, the central archival system to store, in a single record of the complex record type, the accessed content and the accessed metadata.

20. At least one non-transitory computer-readable storage medium encoded with executable instructions that, when executed by at least one processor, cause the at least one processor to perform operations comprising:
establishing, using multiple, different application connectors, connections with multiple, different enterprise applications operated by an organization, the multiple, different application connectors including at least:
a first application connector configured to interface with a first type of enterprise application operated by the organization, and
a second application connector configured to interface with a second type of enterprise application operated by the organization, the second type of enterprise application being different than the first type of enterprise application;
establishing, using an archival system connector, a connection with a central archival system, the central archival system being configured to archive content from the multiple, different enterprise applications in a central location;
receiving, over the connections established using the multiple, different application connectors, content to archive from the multiple, different enterprise applications; and
controlling, using the archival system connector, the central archival system to archive, in the central location, the content received from the multiple, different enterprise applications such that content from the first type of enterprise application is archived in the central location together with content from the second type of enterprise application, wherein controlling the central archival system to archive, in the central location, the content received from the multiple, different enterprise applications comprises:

receiving user input defining a complex record type that includes information from the multiple, different enterprise applications;

defining the complex record type based on the received user input;

detecting an archival operation that uses the complex record type;

in response to detection of the archival operation that uses the complex record type, identifying content needed from the multiple, different enterprise applications to populate the complex record type and identifying metadata needed from the multiple, different enterprise applications to populate the complex record type;

accessing the identified content and the identified metadata; and controlling, using the archival system connector, the central archival system to store, in a single record of the complex record type, the accessed content and the accessed metadata.

\* \* \* \* \*

UNITED STATES PATENT AND TRADEMARK OFFICE
CERTIFICATE OF CORRECTION

PATENT NO. : 8,412,681 B2
APPLICATION NO. : 13/193906
DATED : April 2, 2013
INVENTOR(S) : Shrikrishna Adhiraju, Sudhakar Kanakaraj and Sachin Yambal It is certified that error appears in the above-identified patent and that said Letters Patent is hereby corrected as shown below:

In the Specification

In column 1, line 2, delete "FIELD" and insert --CROSS REFERENCE TO RELATED APPLICATIONS--, therefor.

Signed and Sealed this
Eighteenth Day of June, 2013

Teresa Stanek Rea
*Acting Director of the United States Patent and Trademark Office*